United States Patent [19]
Whitaker

[11] Patent Number: 5,140,645
[45] Date of Patent: Aug. 18, 1992

[54] COMPUTER COMPATIBLE CHARACTER FOR RELIABLE READING BY PHOTOREADER

[76] Inventor: Ranald O. Whitaker, 4719 Squire Dr., Indianapolis, Ind. 46241

[21] Appl. No.: 106,066

[22] Filed: Oct. 8, 1987

[51] Int. Cl.⁵ .............................................. G06K 9/18
[52] U.S. Cl. ...................................... 382/11; 235/456; 283/45; 382/24; 382/65
[58] Field of Search ................ 382/24, 61, 67, 65, 382/11; 434/160; 283/45; 235/441, 456, 462

[56] References Cited

U.S. PATENT DOCUMENTS

| | | | |
|---|---|---|---|
| 3,328,761 | 6/1967 | Yamamoto et al. | 382/67 |
| 3,432,673 | 3/1969 | Mader | 382/67 |
| 3,559,170 | 7/1971 | Barnes | 235/441 |
| 3,578,953 | 5/1971 | Milford | 382/61 |
| 3,643,069 | 2/1972 | Kikuchi | 382/61 |
| 3,699,518 | 10/1972 | Greenough et al. | 382/11 |
| 3,833,882 | 9/1974 | Busby | 382/11 |
| 4,159,471 | 6/1979 | Whitaker | 382/24 |
| 4,357,596 | 11/1982 | Feilchen et al. | 382/61 |
| 4,596,038 | 6/1986 | Yoshida | 382/11 |
| 4,833,720 | 5/1989 | Garcia-Serra | 382/11 |

*Primary Examiner*—Joseph Mancuso

[57] ABSTRACT

A computer compatible master character consisting of a common dot and eight equally spaced arms extending from it is provided. Individual characters are made up of subsets of these eight arms. This system provides a total of 255 characters. Each arm corresponds to a respective bit of a computer word. Numerals constitute a subset of the character set. The master numeral has four arms—each at 45° to the horizontal. This configuration for the master numeral permits a very simple photoreader to be used. Initial use was in reading the code column of a coding sheet for an 8-bit computer.

9 Claims, 4 Drawing Sheets

FIG. 7

COMPUTER COMPATIBLE CHARACTER FOR RELIABLE READING BY PHOTOREADER

BACKGROUND OF THE INVENTION

1. Field of the Invention.

Field is that of a computer compatible character adapted for being easily read by a photoreader. A computer compatible character is a legible character composed of elements each of which elements corresponds to a respective bit of a computer word.

2. Description of Prior Art.

Whitaker, U.S. Pat. No. 4,159,471 discloses a set of computer compatible characters of which the master character is shown in FIG. 1 of the present Application. Of particular interest is the numerical subset of elements forming a master numeral and shown in the present FIG. 2. Numerals are zero to fifteen and appear in FIG. 3.

All lines of every numeral are mutually contiguous. This prevents a numeral consisting of two separated lines from being mistaken for two separate numerals.

All numerals except the six and eleven may be written without lifting the pencil from the paper.

No lines appear in either the upper right or upper left regions of the rectangular character space (CS in FIG. 2) used by the numeral. Also, the lines are relatively congested about the center. For reliable reading by a photoreader it is desirable that the lines be separated as much as possible. The character should be redesigned so that elements appear in the blank upper corners.

Barnes in a U.S. Patent discusses the square shaped computer compatible numeral of FIG. 4. Not all lines are mutually contiguous. If the numerals are handwritten in free format, then question can arise regarding a numeral in which only the right and left sides are present. The two lines could be separate numerals of one vertical line each. Elements are weighted as indicated.

A gentleman in Prague in the 1950's proposed the numeral of FIG. 5. The vertical line serves as a space holder (zero). Numeral is for use with a base-64 numbering system.

Others have suggested computer compatible numerals of various configurations. One such numeral was derived from Roman numerals. Another consisted of staggered horizontal lines. A Dr. Gabrielian of California suggested a numeral identical to that of Whitaker except that the apex angle was made 90° and the numeral was tilted so that one of the sides was vertical and the second was horizontal.

None of the previous disclosures was of a numeral particularly designed to provide ease and reliability of photoreading.

A character is said to be "computer compatible" if it is composed of elements, each element having a respective bit in a computer word. If the element is present in a particular character, its respective bit is hi in the computer word. This invention provides a computer compatible character which is reliably read by a photoreader. The character consists of eight equally spaced arms (elements) extending from a center (common point). This provides a set of 255 characters. The numerals of the hexadecimal numbering system are formed by the four arms extending at angles of 45° to the horizon tal. Of prime interest is reading the code column of a coding sheet and feeding the resultant data to an 8-bit computer. For each 8-bit word two hexadecimal computer compatible numerals are placed side by side in the code column. A read head containing six sensors is drawn down the column. In goes the code.

BRIEF DESCRIPTION OF THE DRAWINGS

FIG. 7 is a Table listing most of the computer compatible characters presently in use and giving their equivalents in ASCII and in "Double Hex" notation.

DETAILS OF THE PREFERRED EMBODIMENT.

Figure 1:
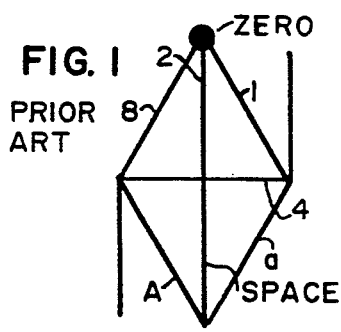
FIG. 1 is a prior art sketch of a computer compatible character disclosed by Whitaker.
Figure 2:
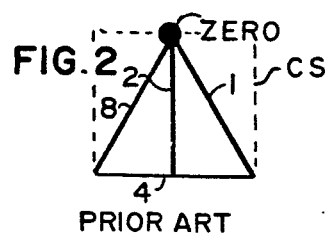
FIG. 2 is a prior art sketch of the computer compatible numeral disclosed by Whitaker.
Figure 4:
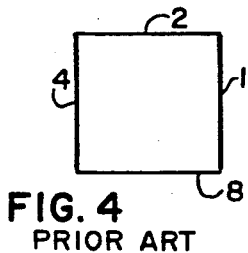
FIG. 4 is a prior art computer compatible numeral used by Barnes.
Figure 3:
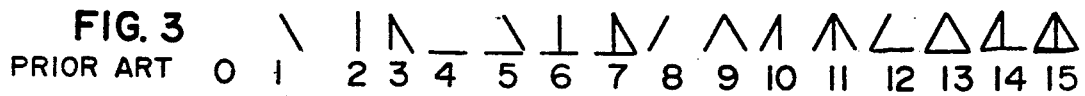
FIG. 3 is a prior art listing of the numerals zero to fifteen in both Arabic and Whitaker CCN's (computer compatible numerals).
Figure 5:
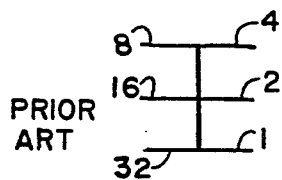
FIG. 5 is a prior art computer compatible numeral suggested by a gentleman in Prague.
Figure 6:
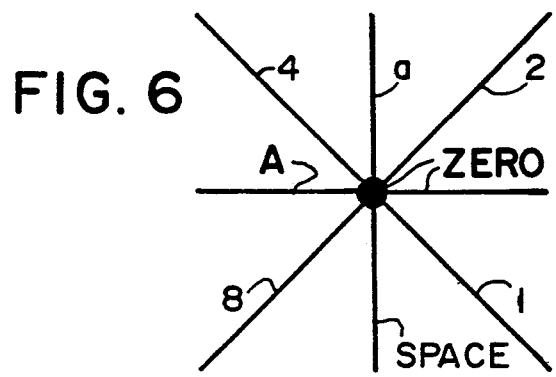
FIG. 6 is a sketch of the computer compatible character presently disclosed.

The character. FIG. 6 shows the master character. The following are significant.

1. The numerical subset by itself permits formation of the numerals of the hexadecimal numbering system.
2. The zero is represented by the left arm and/or the centerdot.
3. The "a" arm in combination with the numerical arms (0,1,2,4,8) provides the letters of the lower case alphabet.
4. The "A" arm in combination with the numerical arms provides the letters of the upper case alphabet.
5. The "Space" arm is an odd ball. Suffice it to say situations do arise in which a character representing space is useful.

The Character Set. The relationship between bits in a computer word and our conventional characters is generally defined by the ASCII code (although IBM and its disciples still use the EBCDIC code). The ASCII code evolved from the old Teletype code and is not abreast of modern technology. Primarily because it does not provide a hexadecimal set of numbers. Secondly, the computer cannot use the number codes directly in arithmetic operations. A third shortcoming involves its use with a combinational keyboard. Consequently it was decided to go over to a new code (Rowcode) which would be abreast of the technology of today. The most used subset of this code is presented in FIG. 7.

Figure 7:
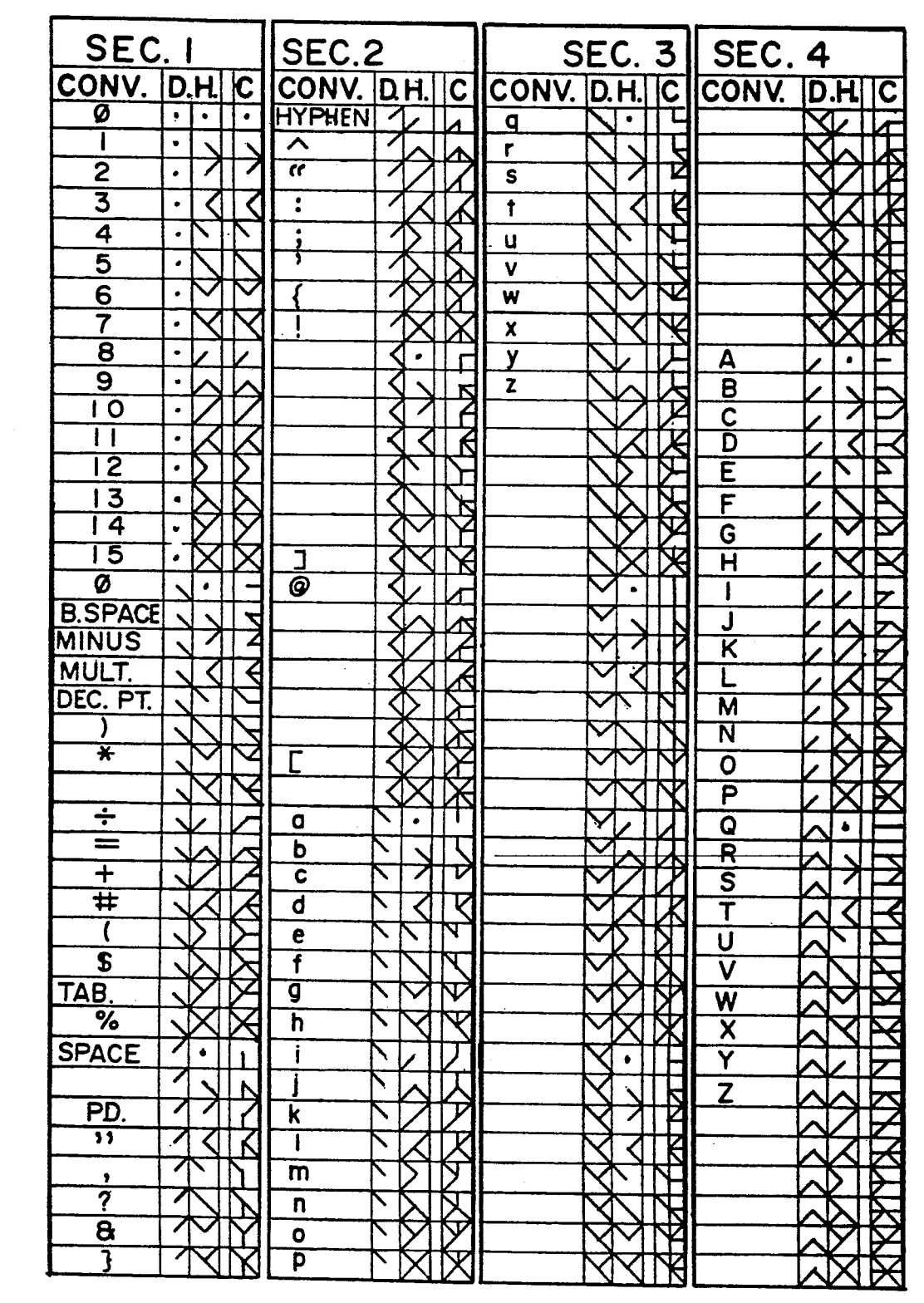

Consider Section 1 of FIG. 7.

The "Conv" column presents "conventional" characters.

The "D.H." column presents the code in "Double-Hex". Since the code is an 8-bit code, each encoded character can be divided into two hexadecimal numerals. This is convenient since one need learn only the digits zero-to-fifteen in order to specify an 8-bit word. The characters appear odd. But with practice one becomes adept at both reading and writing them.

The "C" column gives the full Computer Compatible Character for the particular 8-bit word. The characters appear odd. But with practice one becomes adept at both reading and writing them. A half billion Chinese use similar characters.

Other Sections are similar to Section 1. A total of 153 of the 255 available characters are as yet undefined.

Attention is invited to the "B-Space" appearing in Section 1. This is a command to the computer and is not a character to be printed. It commands the computer to move back one character. It is used in case of an error in keying.

Figure 8:
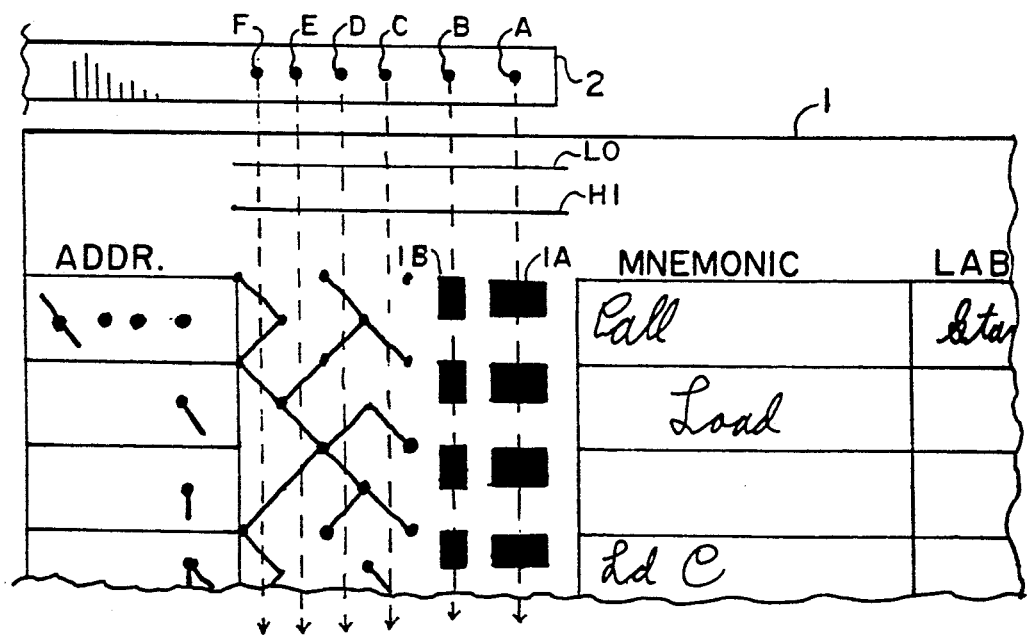
FIG. 8 is a sketch of the upper lefthand corner of a coding sheet, showing usage of computer compatible numerals of the present invention.

The Code Sheet. Numeral 1 of FIG. 8 indicates the upper left corner of a programmer's code sheet The following are of interest.

At the left is the Address Column. The entry in the first row indicates that this program begins at memory location five-zero-zero-zero. Numbering is in hexadecimal to conform to memory structure. Addresses are handwritten by the programmer.

The third column is the Mnemonic Column. Entries indicate the first instruction to be a Call to a Load routine.

Above sheet 1, scanner 2 is positioned. In it are Sensors A, B, C, D, E, and F. The dotted lines dropping from the sensors indicate the paths they take during the scanning process.

The second column is the Code column. Preprinted in this column are the Lo calibration line, the Hi calibration line, and a preprinted matrix of dots serving as aids for writing the double-hex characters. A dull pencil is used in writing in the numerals. Using 8080 code definition, that which is entered in FIG. 8 says "Call location 1013 7 9".

At the right of the code column appear preprinted index blocks IA and IB—one pair for each row of code.

Sensitivity of the sensors is adjusted using the Hi and Lo calibration lines. The preprinted Lo line is of a density just greater than that which may be caused by specks of dirt which may get on the sheet. The preprinted Hi line is of a density significantly less than that which may be expected in any of the numeral lines. The scanner is drawn down and over the two lines. Sensitivity is adjusted so that none of the sensors triggers on the Lo line and all the sensors trigger on the Hi line.

Consider the Scanning of the First Row.

The following events occur in succession: B sensor encounters IB. In response to this, the computer nulls an assembly register (asr)—the register in which the word to be read is assembled.

The A sensor encounters IA. The two indices are part of a system for checking to make sure that the sheet is not too far to the left or to the right. If at any time the A sensor sees black and simultaneously the B sensor sees white—the read operation is aborted. Assume that the paper is in proper lateral position.

As the scanner moves down the sheet, sensors C, D, E, and F see black at some time—provided the lines for which they are looking are present. Those which see black set respective bits 2, 4, 20 and 40 in asr. In the present case, bits 4 and 40 will be set.

The A and B sensors move from black to white.

The C, D, and F sensors see black. Since the A and B sensors see white, C, D, and F sensors set the 1, 8, and 80 bits in asr.

The B sensor moves from white to black of the next character pair. This signals the computer that the two hex characters have been read. The computer moves the word to memory. It then nulls the asr preparatory to reading the next pair of hex numerals.

The operation repeats for succeeding pairs of numerals.

Optical fibers were used in the prototype. Miniature opto sensors are now available which can be placed in the read head itself. Patent application Ser. No. 06/561 946 entitled Photoelectric Reader for Computer Compatible Characters discusses an earlier model of the reader.

Figures 9, 10, 14:
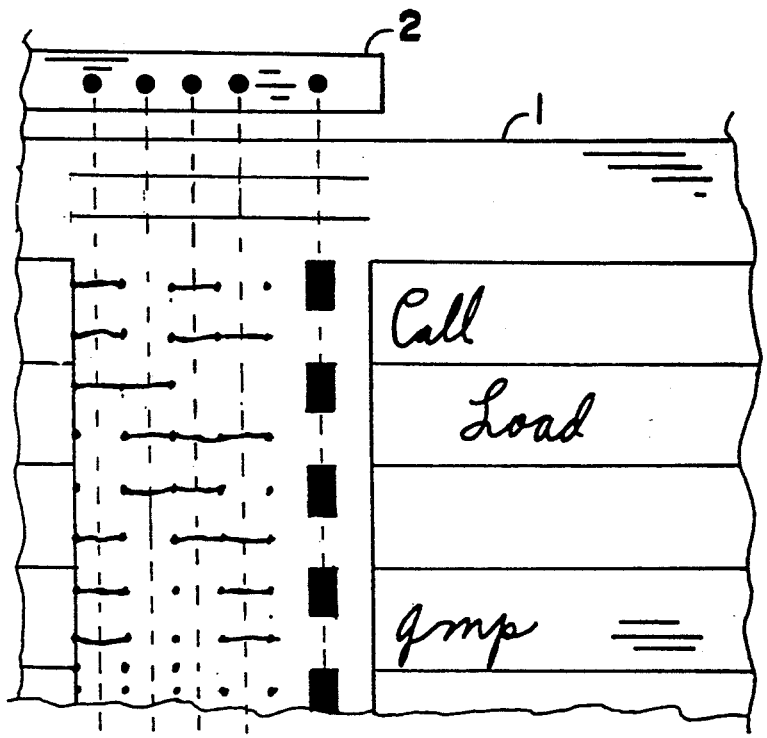
FIG. 9 is a sketch of the master character of a set of computer compatible numerals which would be even more reliably read by a photoreader.
FIG. 10 is a sketch of a code sheet using the hi-reliability computer compatible numeral.
FIG. 14 is a diagram showing a computer compatible character modified for horizontal scanning.

Alternate Marking of Programmer Code Sheet. For the system of FIG. 8, the scan paths must pass through the central portions of the arms. If they pass too near the ends of the arms, errors in reading can result. Trouble from this source is reduced if the character configuration of FIG. 9 is used. This changes the code of FIG. 8 to that of FIG. 10. The code of FIG. 10 permits the scanning to take place anywhere from one end of an arm to the other. However, such broadening of the lateral registry requirement is hardly necessary. It hardly justifies the introduction of this more cumbersome character set.

Figure 11:
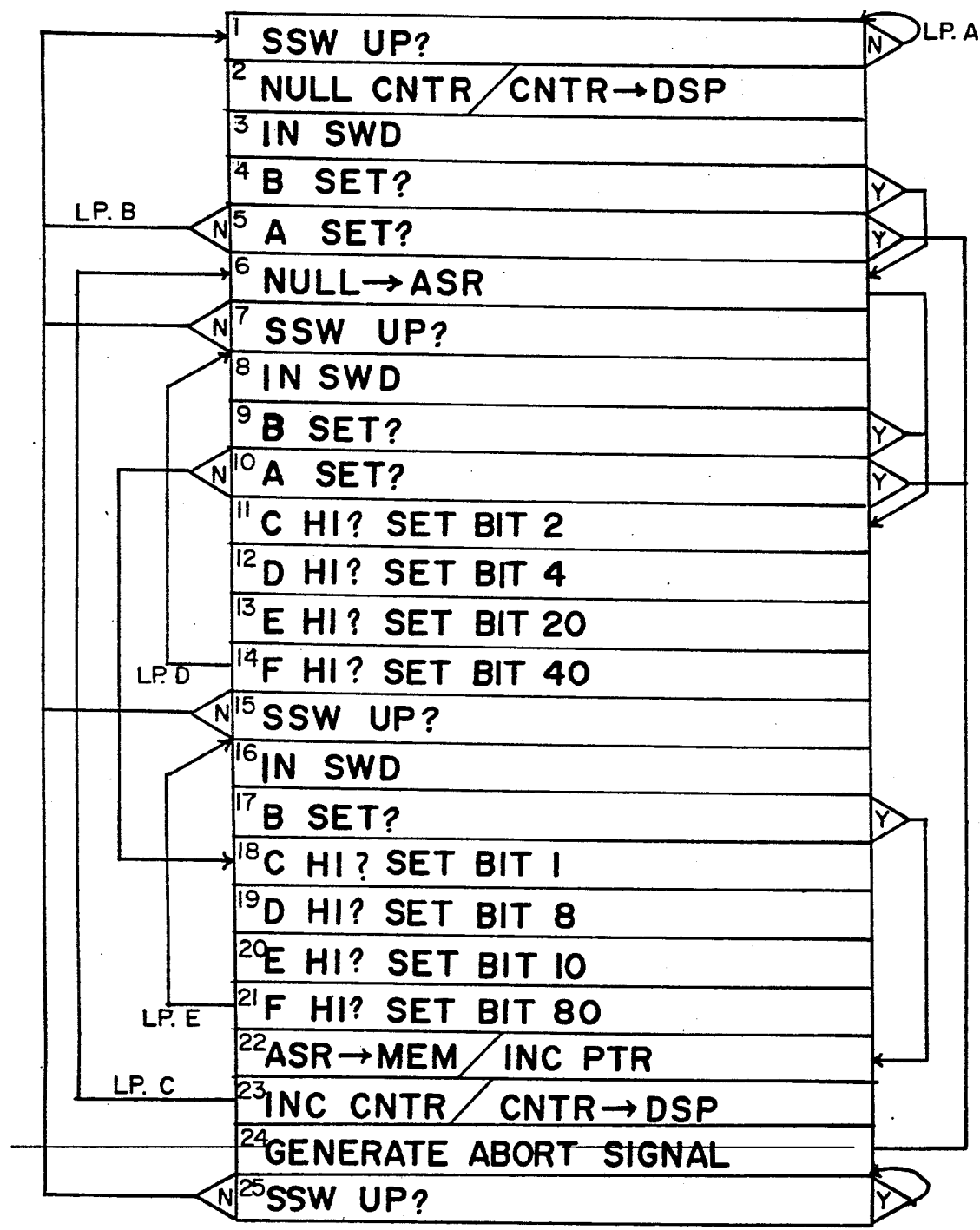
FIG. 11 is a flow diagram for a driver for the reader.

The Flowchart. See FIG. 11. Steps will be discussed in order.

1. Is the Sense Switch (ssw) Up? This is a switch on the front panel of the computer. It is left down while code sheets are inserted and removed and while calibration of the sensors is being performed. When ready to read, the operator places the scanner in the blank area just above the first pair of numerals and raises ssw. This step is a wait loop in which the computer stays until the switch is raised.

2. Null the Counter. This counter counts the number of characters which have been received by the computer. The count is delivered to a display visible to the operator. The operator can at any time check the count against the line number on the code sheet—they should agree.

3. Input the Sensor Word. This word is made up of the outputs of the six sensors.

Note that the system is in a wait loop consisting of steps 1, 2, 3, 4, and 5. It will stay in this loop until either A or B sees black.

4. Does B see Black? If it does, then the scanner has been drawn down until B sees the top edge of IB. A jump will then be made to a loop for reading in the top halves of the two numerals.

5. If B Does not See Black, then Does A see Black? This is a check to prevent error in horizontal registry from causing errors. Note that IA is sufficiently wide that A will virtually always see IA regardless of error in horizontal registry. Note also that IA is slightly less in height than IB. Consequently, if A sees IA but B does not see IB, then the sheet is off in horizontal registry and a jump to an abort routine is made. If neither A nor B sees black, then the scanner has not reached the level of the numerals as yet and a jump is made back to the start of the program.

6. Null the assembly register (asr). The computer assembles the character in this register as scanning proceeds. It nulls this register at the present time in preparation for assembling the next character. This is the first step of Loop C—the loop which reads a pair of numerals.

7. Is the Sense Switch Still Up? This question is asked in every loop in order that the operator can stop the read operation at any time. If the switch has been dropped, then the computer moves back to Loop A. This is the first step of Loop D—which reads the upper halves of the two numerals.

8. Bring in the Sensor Word.

9. Does B See Black? If it does, then jump to the routine which assembles the character into asr. If it does not see black, then the scanner has moved down the page until it has passed the centerline of the two numerals.

10. Does A see Black? If B does not see black but A sees black—then the system is at fault and a jump to the abort routine is made. If A also does not see black, then the scanner has been drawn below the upper halves of the numerals and a jump to a routine for reading the lower halves is made.

11. Does C see Black. When so, set the 2 bit in asr.

12. Does D see Black? Yes. Set the 4 bit.

13. Does E see black? Yes. Set the 20 bit.

14. Does F see black? Yes. Set the 40 bit.

The computer operates in the D loop until B drops below IB. It then jumps to the E loop.

15. Is the Sense Switch Up? Dropping this switch permits the operator to stop the scanning. The system is now in the E loop. It is scanning the bottom halves of the numerals.

16. Bring in the sensor word.

17. Does B see black? If it does, then the scanner has been drawn below this set of characters and the system should prepare for the next pair.

18. Does C see black? If so, set the 1 bit in asr.

19. Does D see black? If so, set the 8 bit in asr.

20. Does E see black? If so, set the 10 bit in asr.

21. Does F see black? If so, set the 80 bit in asr.

22. Move the word stored in asr to memory. Increment the memory pointer.

23. Increment the counter and feed the counter to the display. This keeps the operator apprised of how many characters have been read. He can check this against the number indicated on the code sheet. Then jump back to the C loop and read the new pair of numerals.

24. This Abort Signal was a flashing Led on the front of the computer.

25. Is ssw up? System stays in this loop until the operator removes the cause for the abort and drops this switch. At which time the system returns to the A loop.

Alternate Scanning. Symmetry of the character is such that, the same read head may be used for scanning characters in the horizontal direction. A minor change in the software is required. The first application of the system has been in reading of the code column on a coding sheet. Main usage will probably be in reading rows of computer compatible text on pages such as that on which this patent application is being written.

Figure 12:
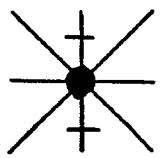
FIG. 12 is an illustration of how the dot is used to identify numerals.

Freehand Writing of the Numerals. As shown in FIG. 12, the center dot may be inserted to avoid possible confusion. The dot by itself is a zero.

Figure 13:
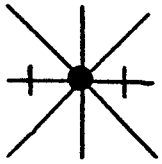
FIG. 13 is a diagram showing a computer compatible character modified for vertical scanning.

Crossbars. See FIG. 13. To insure that vertical elements are read, crossbars as wide as IB are positioned as shown. For horizontal scanning, crossbars are installed on horizontal elements as shown in FIG. 14.

Reliability of Reading—is a function of uniformity of paper. The reflectivity must be uniform in the case of reflective scanning. The transmissivity must be uniform in the case of transmissive scanning. Size of dark spots is also important. The use of a soft, dull pencil produces best results. However, as line width goes up, size of character must be increased proportionately. The diameter of the sensor should be about the same as the width of a line.

I claim:

1. A system for storing and reading information as legible characters on a medium; said legible characters having a master character;

said master character comprising a set of master character elements;

said set being divided into a first subset and a second subset;

said first subset of said master character elements being line elements;

each of said line elements of said master character having one end positioned at a common point and each line extending radially from said common point said second subset being a single dot placed at said common point;

each of said characters comprising a respective subset of said master character elements; and said system including a scanner for scanning said character.

2. A system as in claim 1;

a subset of said characters being numerals;

a master numeral of said numerals including four of said line elements;

a first of said line elements extending from said common point downward and to the right;

a second of said line elements extending from said common point upward and to the right;

a third of said line elements extending from said common point upward and to the left; and a fourth of said line elements extending from said common point downward and to the left.

3. A system as in claim 2;

said single dot when appearing by itself representing the number zero.

4. A system as in claim 2;

said four line elements being weighted 1, 2, 4, and 8 respectively; and each of said numerals comprising that combination of said line elements for which the sum of the respective weights is equal to the number represented.

5. A system as in claim 2;

a fifth of said line elements extending from said common point to the right;

a sixth of said line elements extending from said common point upward;

a seventh of said line elements extending from said common point to the left; and an eighth of said line elements extending from said common point downward.

6. A system as in claim 5; and each of said vertical lines bearing a horizontal crossbar.

7. A system as in claim 5; and each of said horizontal lines bearing a vertical crossbar.

8. A system as in claim 1;

said system being adapted for accommodating handwritten characters;

said medium bearing a preprinted matrix of matrix dots;

at each character position a respective subset of said matrix dots being positioned; and for each line element of said master character there being a respective matrix dot of said subset of matrix dots indicating the position of the free end of said respective line when said master character is inscribed in said character position.

9. A system as in claim 1;

said characters appearing in a column on said medium;

said characters being divided into subsets and each of said subsets appearing in a respective row;

a set of preprinted indicia on said medium;

said indicia being divided into subsets and each of said subsets appearing in a respective row of said rows;

said scanner being adapted for scanning said characters and indicia in a vertical direction;

said scanner having a set of sensors;

each of a first subset of said sensors being adapted for scanning a respective subset of said elements;

each of a second subset of said sensors being adapted for sensing a respective subset of said indicia; and the arrangement being such that whenever presence of an element is sensed by its respective sensor, a respective combination of said indicia is sensed; and the outputs of said indicia sensors plus the output of said element sensor constituting a unique combination identifying said element.

* * * * *